United States Patent
Sun et al.

(10) Patent No.: US 9,866,246 B1
(45) Date of Patent: Jan. 9, 2018

(54) DIGITAL TRANSMITTER CHANNEL OPTIMIZATION DEVICE

(71) Applicant: L-3 Communications Corp., New York, NY (US)

(72) Inventors: June Y Sun, Salt Lake City, UT (US); William K McIntire, Sandy, UT (US)

(73) Assignee: L-3 Communications Corp., New York, NY (US)

( * ) Notice: Subject to any disclaimer, the term of this patent is extended or adjusted under 35 U.S.C. 154(b) by 0 days.

(21) Appl. No.: 15/247,568

(22) Filed: Aug. 25, 2016

(51) Int. Cl.
*H04L 25/49* (2006.01)
*H04B 1/04* (2006.01)
*H04L 27/36* (2006.01)

(52) U.S. Cl.
CPC ........... *H04B 1/0475* (2013.01); *H04L 25/49* (2013.01); *H04L 27/368* (2013.01); *H04B 2001/0408* (2013.01); *H04B 2001/0425* (2013.01)

(58) Field of Classification Search
CPC ... H03F 1/3247; H03F 1/3241; H04B 1/0475; H04B 2001/0425; H04B 2001/0433; H04L 27/368; H04L 27/2614; H04L 27/367
USPC ........................................ 375/296, 297, 232
See application file for complete search history.

(56) References Cited

U.S. PATENT DOCUMENTS

| | | | | |
|---|---|---|---|---|
| 7,382,835 B2* | 6/2008 | Anvari | ...................... | H03F 1/02 375/296 |
| 8,666,336 B1* | 3/2014 | Dick | ...................... | H04B 17/11 375/296 |
| 2005/0163252 A1* | 7/2005 | McCallister | .......... | H03F 1/3247 375/296 |
| 2008/0130789 A1* | 6/2008 | Copeland | .............. | H03F 1/3247 375/297 |
| 2012/0098549 A1* | 4/2012 | Wang | ................... | G01N 27/026 324/649 |
| 2016/0065250 A1* | 3/2016 | Volokhine | ............ | H04B 1/0475 375/297 |

\* cited by examiner

*Primary Examiner* — David S Huang
(74) *Attorney, Agent, or Firm* — Brian Tucker; Kirton McConkie

(57) ABSTRACT

A digital transmitter channel optimization device can be employed within or in conjunction with a transmitter to perform a number of techniques in the digital domain to account for distortion introduced in the transmitter. The optimization device can be configured to perform such techniques on an arbitrary signal to thereby allow the optimization device to be used with virtually any transmitter. The optimization device may be particularly beneficial in wideband systems where accounting for distortion can be difficult to accomplish using existing techniques.

15 Claims, 8 Drawing Sheets

DIGITAL TRANSMITTER CHANNEL OPTIMIZATION DEVICE

CROSS-REFERENCE TO RELATED APPLICATIONS

N/A

BACKGROUND

The present invention is generally directed to an electronic device that can be incorporated into or used in conjunction with a generic transmitter to perform a number of channel optimizations on an arbitrary signal prior to the signal being amplified by a downstream power amplifier.

FIG. 1 provides an example of a generic transmitter 100 that can be configured to receive an analog input signal from a baseband processor or modulator 105, perform necessary processing on the signal, and then output the processed signal to an antenna 110 for transmission. Generic transmitter can include a frequency upconverter (or mixer) 100a to convert the analog input signal to the proper frequency (assuming the signal generated by modulator 105 is not already at the proper frequency), a variable gain control 100b (e.g., amplifier, attenuator or combination of both), and a power amplifier 100c for amplifying the upconverted signal prior to transmission.

When output from modulator 105, the analog input signal typically will have little to no distortion. However, the components of transmitter 100 will typically introduce distortion in various forms including group delay variation, nonlinear distortion, and frequency flatness among others. This is especially true when the input signal is a wideband signal (e.g., a signal having a bandwidth between 500 MHz and 1 GHz). Although a number of techniques exist for accounting for the distortion introduced by transmitter 100, it can be difficult to successfully account for all distortion especially in wide bandwidth systems.

BRIEF SUMMARY

The present invention extends to a digital transmitter channel optimization device that can be employed within a transmitter to perform a number of techniques in the digital domain to account for distortion introduced in the transmitter. The optimization device of the present invention can be configured to perform such techniques on an arbitrary signal to thereby allow the optimization device to be used with virtually any transmitter. The optimization device may be particularly beneficial in wideband systems where accounting for distortion can be difficult to accomplish using existing techniques.

In one embodiment, the present invention is implemented as a digital transmitter channel optimization device that includes a first input configured to receive a signal from a modulator and a digital signal processing unit configured to receive the signal and to apply pre-distortion to the signal in the digital domain. The digital signal processing unit includes an intermodulation distortion suppressor, a first equalizer, and a linearizer. The optimization device can also include a digital-to-analog converter for converting the pre-distorted signal to an analog signal and a first output configured to output the pre-distorted analog signal to a transmitter.

In another embodiment, the present invention is implemented as a digital transmitter channel optimization device that includes a first input configured to receive a signal from a modulator and a digital signal processing unit that includes a channel sounding stimulus generator that generates a stimulus signal and that is configured to receive the signal from the modulator and to apply pre-distortion to the signal in the digital domain. The digital signal processing unit can include an intermodulation distortion suppressor, an equalizer, and a linearizer. The optimization device can further include a digital signal processing unit controller that is coupled to the digital signal processing unit and that configures the intermodulation distortion suppressor, the first equalizer, and the linearizer. The optimization device can also include a second input for receiving the stimulus signal after it has been amplified by a power amplifier of a transmitter with which the optimization device is used, an analog-to-digital converter for converting the amplified stimulus signal into digital samples, and a channel estimator that is implemented in either the digital signal processing unit or the digital signal processing unit controller and that receives the digital samples of the amplified stimulus signal and estimates distortion in the amplified stimulus signal. The channel estimator configures one or more of the intermodulation distortion suppressor, the equalizer, or the linearizer to introduce pre-distortion to the signal from the modulator based on the estimated distortion in the amplified stimulus signal. The optimization device can further include a digital-to-analog converter for converting the pre-distorted signal from the modulator or the stimulus signal to an analog signal and a first output configured to output the pre-distorted analog signal or the analog stimulus signal to the transmitter.

In another embodiment, the present invention is implemented as a digital transmitter channel optimization device that includes a first input configured to receive a signal from a modulator, a digital signal processing unit configured to receive the signal from the modulator and to apply pre-distortion to the signal in the digital domain and to generate a stimulus signal, a digital-to-analog converter for converting the pre-distorted signal or the stimulus signal to an analog signal, a first output configured to output the pre-distorted analog signal or the analog stimulus signal to a transmitter, a second input for receiving the analog stimulus signal after the analog stimulus signal has been amplified by a power amplifier of the transmitter, a digital-to-analog converter for converting the amplified stimulus signal to digital samples, and a channel estimator that is configured to evaluate the digital samples of the amplified stimulus signal to estimate distortion present in the amplified stimulus signal. The channel estimator configures the digital signal processing unit to apply the pre-distortion to the signal from the modulator based on the estimated distortion.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
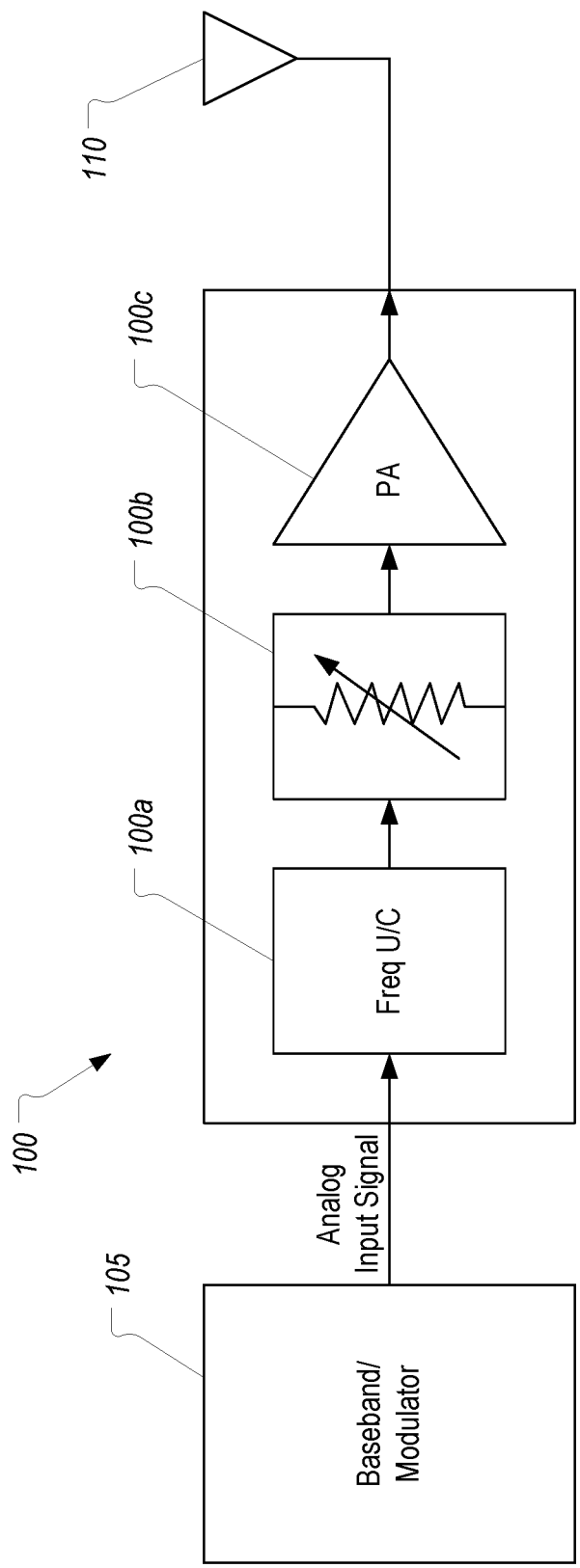
FIG. 1 provides a block diagram of a generic transmitter.
Figure 2:
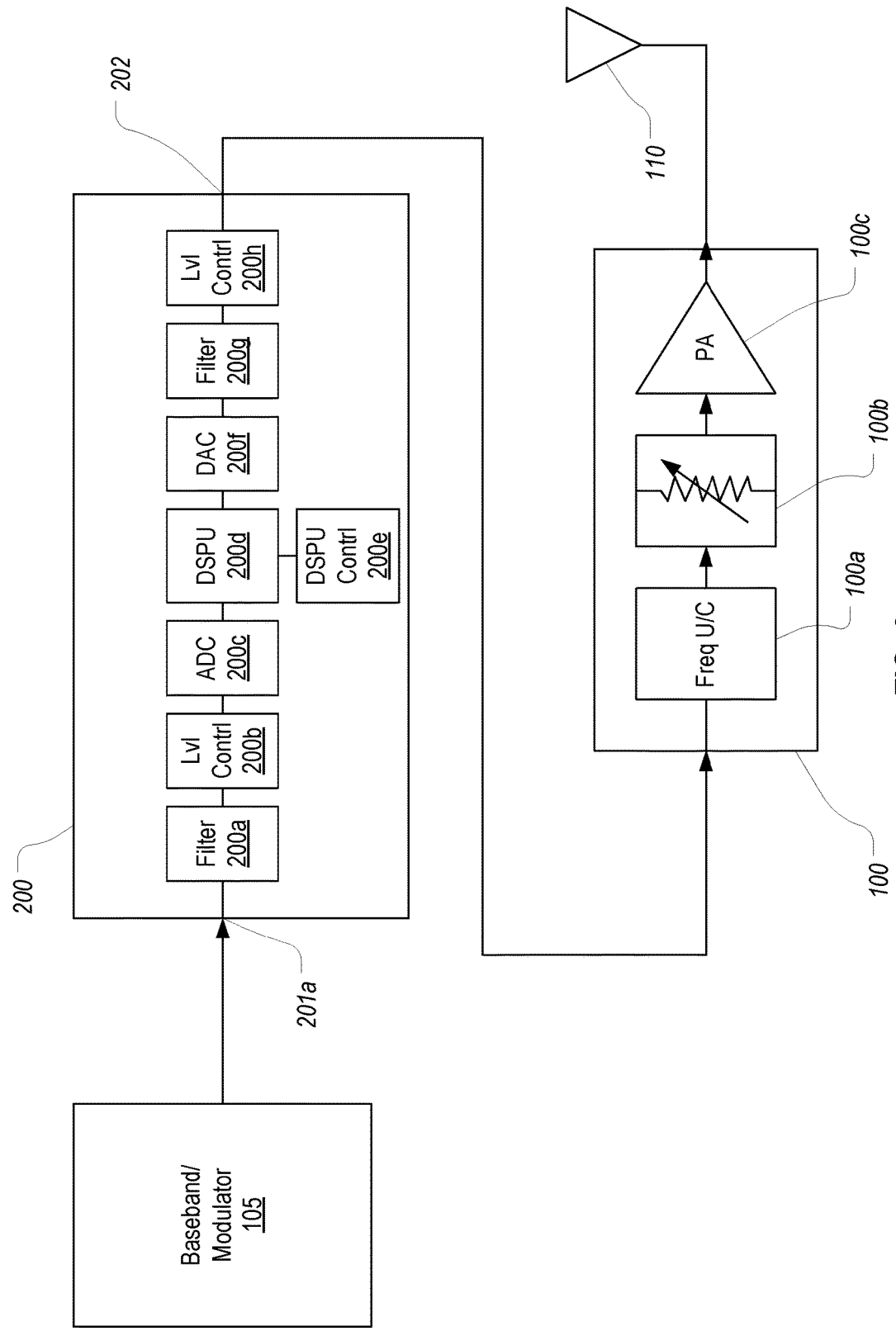
FIG. 2 provides a block diagram illustrating a digital transmitter channel optimization device in accordance with embodiments of the present invention that can be used to pre-distort a signal output by a modulator to account for distortion that will be introduced in a downstream transmitter.

FIG. 2 illustrates a block diagram similar to the block diagram of FIG. 1 but with the addition of a digital transmitter channel optimization device 200 that is configured in accordance with embodiments of the present invention. As shown, optimization device 200 can be positioned between modulator 105 and transmitter 100. In some embodiments, optimization device 200 may be a standalone component, while in others, it may be incorporated into transmitter 100. Optimization device 200 may be configured as a standalone product to allow it to be used as an "off-the-shelf" product.

Optimization device 200 can include an input 201a for receiving an analog input signal that is output from modulator 105 and an output 202 for outputting a pre-distorted version of the input signal to transmitter 100. As will be described in detail below, optimization device 200 can pre-distort the input signal to account for distortion that will occur as the signal passes through transmitter 100 and possibly other components of the downstream channel.

Figure 2A:
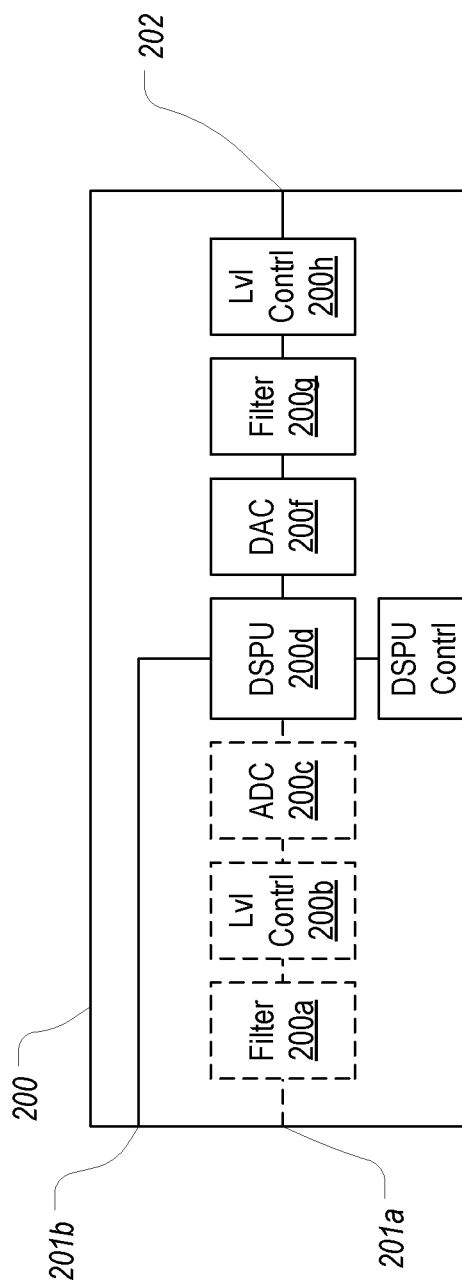
FIG. 2A illustrates an alternate embodiment of a digital transmitter channel optimization device.

FIG. 2A illustrates an alternate embodiment of optimization device 200 in which the device includes both analog input 201a and a digital input 201b. Optimization device 200 may be configured with both of these inputs to allow it to be used with modulators that provide either or both an analog or a digital output. Input 201a and the various components along the input path are shown in dashed lines to represent that optimization device 200 may only include digital input 201b in some embodiments. Embodiments of optimization device 200 may therefore be configured to only receive an analog input, to only receive a digital input, or to receive either an analog or a digital input.

When optimization device 200 includes analog input 201a, it may also include filter 200a, level controller 200b, and analog-to-digital converter 200c. Filter 200a can be a bandpass filter that conforms to the bandwidth of the analog input signal output from modulator 105. In some embodiments, the passband of filter 200a can be tunable to allow optimization device 200 to be usable with a wide variety of modulators and modulator configurations. Level controller 200b, which may be in the form of an amplifier, attenuator, or other suitable gain control component, can be configured to adjust the power of the analog input signal to a level that is optimized for the input dynamic range of analog-to-digital converter 200c. Analog-to-digital converter 200c can convert the analog input signal into digital samples for input to digital signal processing unit 200d where a number of pre-distortion techniques can be performed. In contrast, if optimization device 200 is configured with digital input 201b, digital input 201b can be coupled directly to digital signal processing unit 200d so that a digital input signal output from modulator 105 can be input to digital signal processing unit 200d.

As will be described in detail below, optimization device 200 can include digital signal processing unit 200d for processing the input signal in the digital domain to introduce pre-distortion into the signal that will account for, or offset, distortion that will be introduced in the downstream components of transmitter 100, particularly within power amplifier 100c. Digital signal processing unit 200d can be in the form of an FPGA, ASIC, or processor (e.g., DSP uP GPU, etc.). Optimization device 200 can also include a digital signal processing unit controller 200e for controlling the functionality of digital signal processing unit 200d including providing an interface by which parameters employed by digital signal processing unit 200d can be manually input and/or updated.

Once the input signal has been processed by digital signal processing unit 200d and therefore includes appropriate pre-distortion, the pre-distorted signal can be output from digital signal processing unit 200d through a digital-to-analog converter 200f, filter 200g, and level controller 200h. Filter 200a can remove frequencies from the output of digital-to-analog converter 200f that are outside of a desired passband. As with filter 200a, filter 200g can be tunable in some embodiments to allow optimization device 200 to be used to process signals of different frequencies and bandwidth. Level controller 200h, which may be in the form of an amplifier, attenuator, or other suitable gain control component, may be employed to set the power of the output of optimization device 200 to a desired level. Finally, optimization device 200 can include output 202 by which the pre-distorted signal can be output to transmitter 100.

Figure 3:
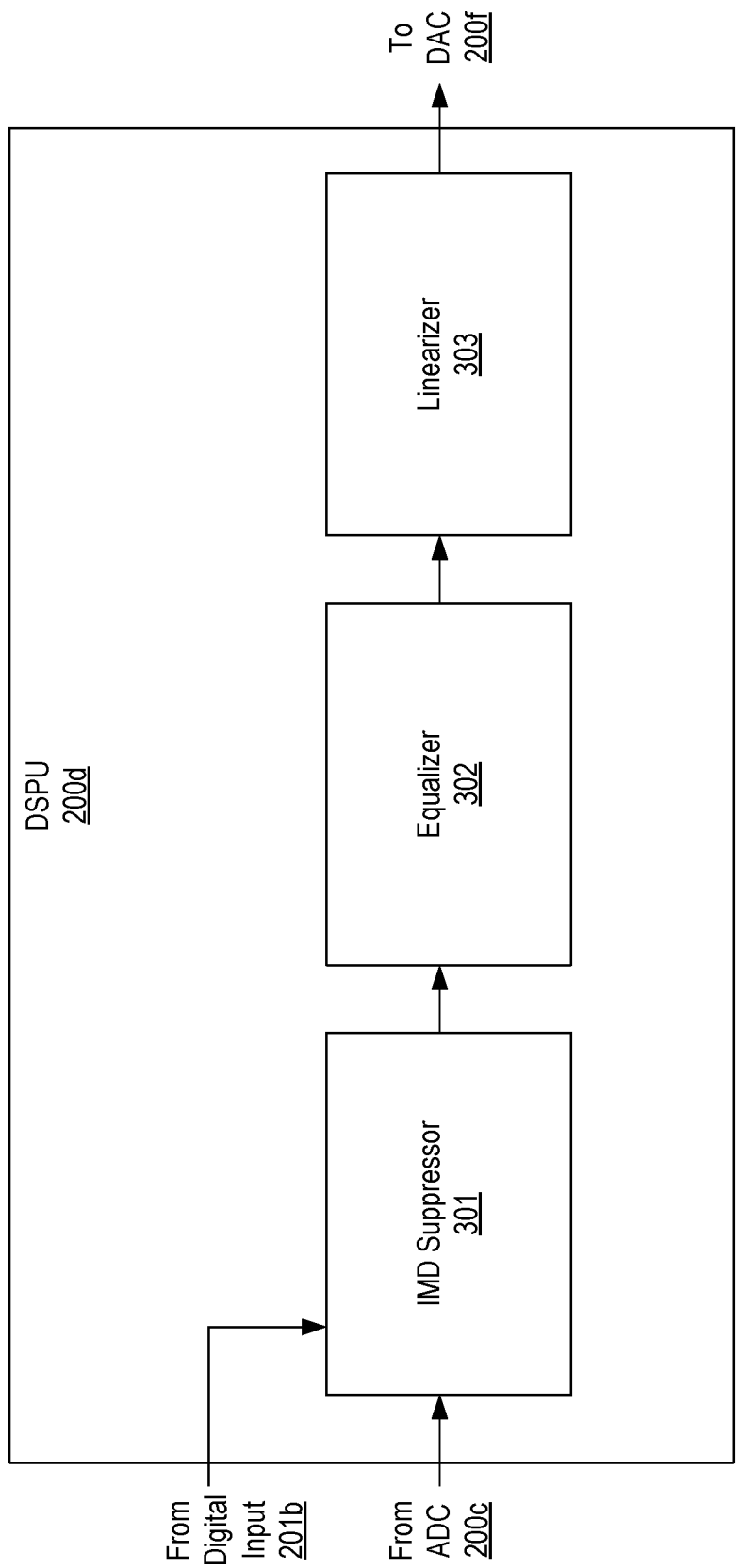
FIG. 3 illustrates components of a digital signal processing unit of the digital transmitter channel optimization device.

Turning now to FIG. 3, the individual components implemented within digital signal processing unit 200d are shown. These components include an intermodulation distortion suppressor 301, an equalizer 302, and a linearizer 303. Each of these components can be implemented within digital signal processing unit 200d to cause the digital signal output from digital signal processing unit 200d to include multiple types of pre-distortion. Digital signal processing unit controller 200e can be employed to configure digital signal processing unit 200d generally, and more specifically, to configure intermodulation distortion suppressor 301, equalizer 302, and linearizer 303 to generate this pre-distortion so that it offsets distortion that will be introduced by the components of a downstream transmitter such as transmitter 100.

Intermodulation distortion suppressor 301 can be employed primarily to reduce the peak-to-peak average power ratio of the input signal so that a downstream power amplifier (e.g., power amplifier 100c) can be operated closer to its saturation point without clipping the signal. In some embodiments, intermodulation distortion suppressor 301 can be configured in the manner described in U.S. Pat. No. 8,963,608 which is incorporated herein by reference. As an overview, intermodulation distortion suppressor 301 can employ two stages of clipping where the first stage is configured to introduce intermodulation distortion that will offset intermodulation distortion introduced in the second stage. The end result is a signal with a reduced peak-to-peak average power ratio and minimal intermodulation distortion. Digital signal processing unit controller 200e can be employed to manually configure intermodulation distortion suppressor 301 based on a particular target application (e.g., by setting parameters, or coefficients, employed by intermodulation distortion suppressor 301 suitable for characteristics of the input signal produced by modulator 105).

After the input signal is passed through intermodulation distortion suppressor 301 to reduce its peak-to-peak average power ratio, the input signal can be processed through equalizer 302 which can introduce pre-distortion that can primarily compensate for distortion that will be introduced by components of a transmitter upstream of the power amplifier (e.g., distortion introduced by frequency upconverter 100a, variable gain control 100b (e.g., amplifier, attenuator, or combination of both), the downstream components of optimization device 200, the various transmission lines and connections, etc.) due to group delay variation or other frequency-based distortion parameters. For example, equalizer 302 can be configured to amplify high frequency components of the input signal to account for frequency dependent loss that will occur to those high frequency components as the input signal passes through transmitter 100. Again, digital signal processing unit controller 200e can be employed to manually configure equalizer 302 for a particular target application (e.g., based on measured or calculated flatness of a signal that has passed through the downstream components).

Next, the input signal can be passed through linearizer 303 which can add additional pre-distortion to account for the non-linear characteristics of the downstream power amplifier. As indicated above, digital signal processing unit controller 200e can be employed to manually configure linearizer 303 to provide the proper pre-distortion based on the target application (e.g., based on measured or calculated non-linear characteristics of a power amplifier with which optimization device 200 will be employed).

Figure 3A:
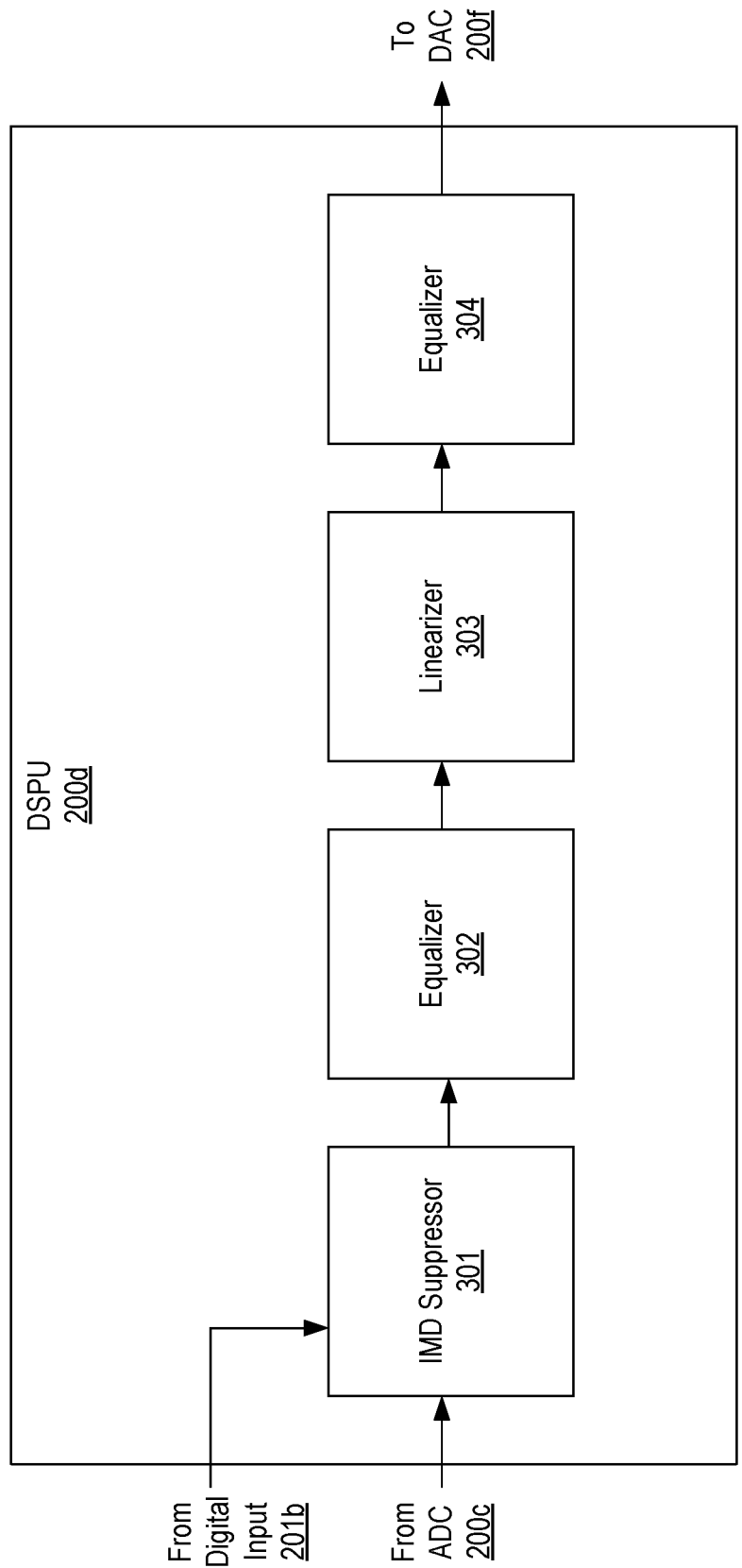
FIG. 3A illustrates components of an alternate embodiment of a digital signal processing unit of the digital transmitter channel optimization device.

In some embodiments, such as is shown in FIG. 3A, digital signal processing unit 200d may also implement a second equalizer 304 which can be positioned downstream of linearizer 303. Equalizer 304 can be tasked primarily with pre-distorting the input signal to offset distortion that will be introduced by components that are downstream of the power amplifier (e.g., based on measured or calculated flatness of a signal after it has passed through such downstream components).

Accordingly, digital signal processing unit 200d can be configured to implement a number of components that are each configured to introduce a particular type of pre-distortion in the digital domain for offsetting distortion that will occur as the analog signal passes through a downstream transmitter. Pre-distortion can be introduced in this manner to a signal of any bandwidth but can be particularly beneficial in high bandwidth systems (e.g., 500 MHz-1 GHz systems) where a large amount and variation of distortion may occur.

In the embodiments of optimization device 200 described above, the operational parameters of digital signal processing unit 200d can be input prior to use of optimization device 200 in an intended application. The value of these parameters can be generated based on performance measurements or calculations of the downstream transmitter with which optimization device 200 will be employed (e.g., by analyzing a known signal at various points within transmitter 100 or based on known specifications of transmitter 100 in general or of the individual components of transmitter 100). In other words, digital signal processing unit controller 200e can be employed to tune digital signal processing unit 200d for use with a particular transmitter and at a particular bandwidth based on prior knowledge of the transmitter's performance characteristics across the particular bandwidth.

In some embodiments, however, optimization device 200 may include additional circuitry to stimulate and measure both the linear and non-linear distortion characteristics of the downstream channel including downstream components of optimization device 200, the components of the transmitter, and any interconnecting components (e.g., analog filters, frequency converters, cables, waveguides, attenuators, driver amplifiers, the power amplifier, etc.).

Figure 4:
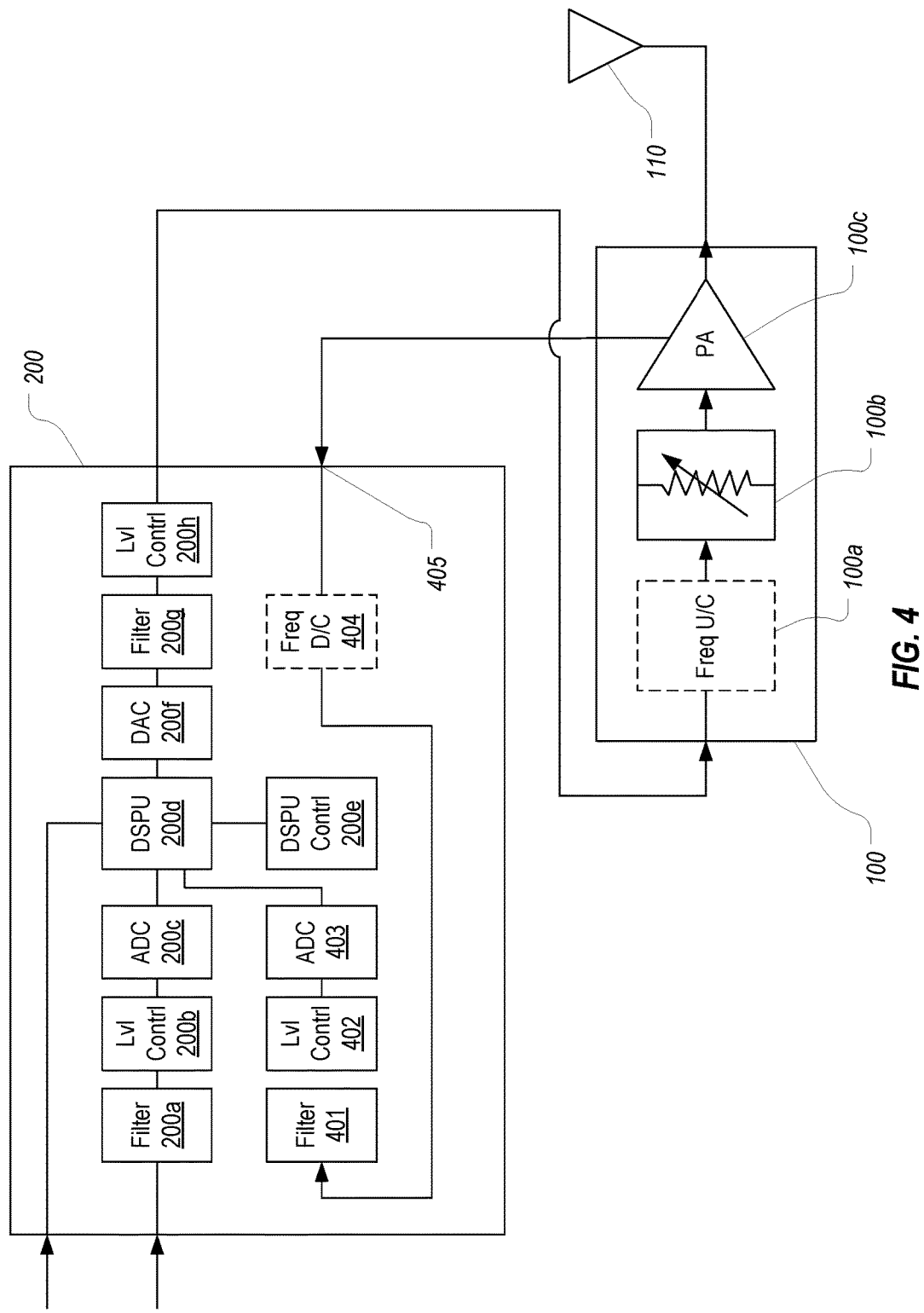
FIG. 4 illustrates an embodiment of a digital transmitter channel optimization device that is configured to estimate and account for distortion caused by a downstream transmitter.

This additional circuitry for stimulating and measuring the distortion characteristics is illustrated in FIG. 4. As shown, optimization device 200 can include a second analog input 405 for receiving the amplified signal output from power amplifier 100c as well as a frequency downconverter 404 for downconverting this signal. Frequency downconverter 404 is shown in dashed lines to indicate that it may be optional since, in some embodiments, transmitter 100 may not include a frequency upconverter.

The output of power amplifier 100c, after possible downconversion, can be passed through filter 401, level controller 402 and analog-to-digital converter 403 (which are similar to filter 200a, level controller 200b, and analog-to-digital converter 200c respectively) so that suitable digital samples of the power amplifier's output can be input back to digital signal processing unit 200d where the linear and non-linear distortion present in the output can be identified and employed to configure intermodulation distortion suppressor 301, equalizer 302, linearizer 303, and possibly equalizer 304 to generate pre-distortion to offset this identified distortion.

Figure 5:
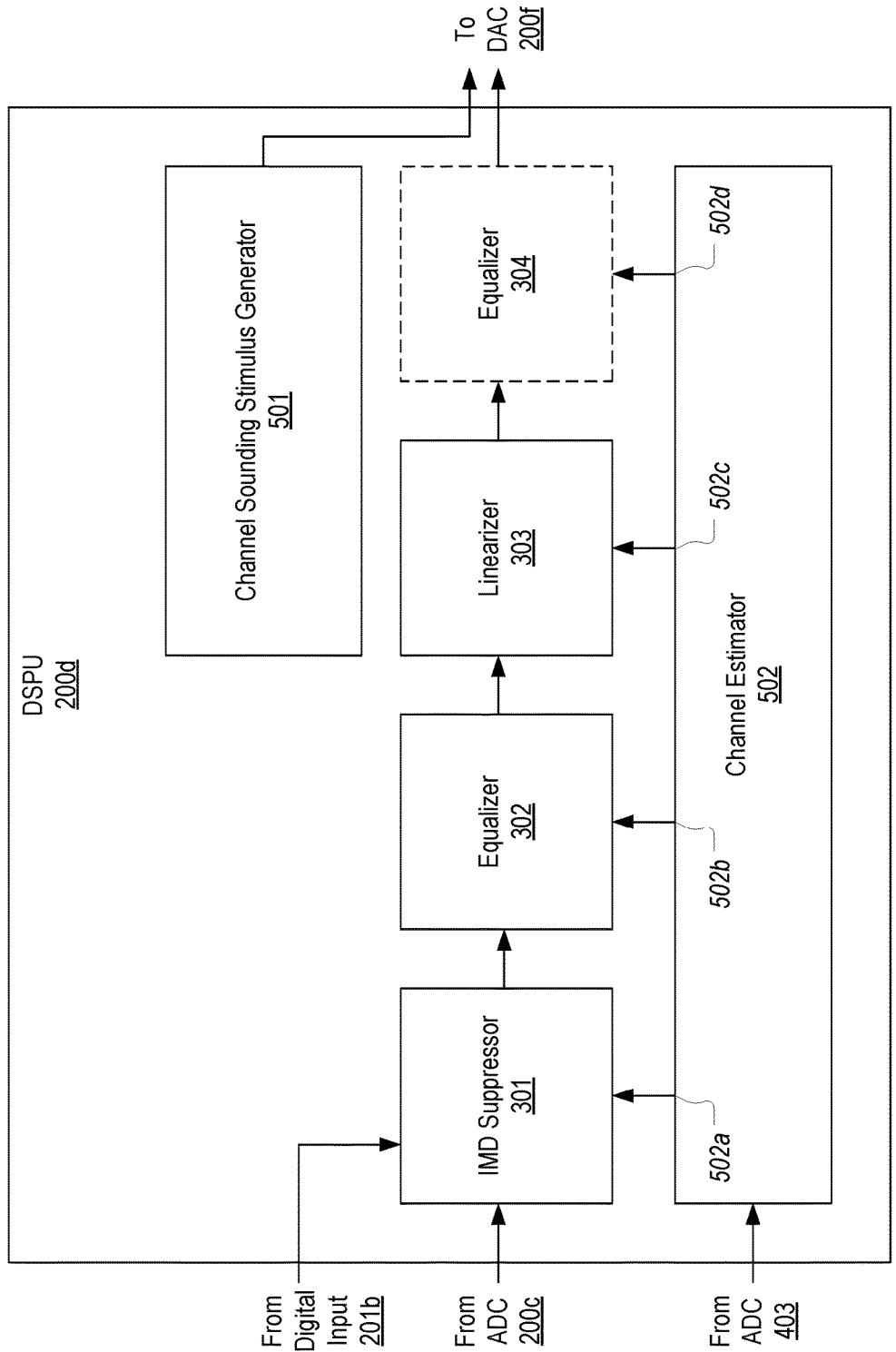
FIG. 5 illustrates components of a digital signal processing unit of the digital transmitter channel optimization device depicted in FIG. 4.

FIG. 5 illustrates the components of digital signal processing unit 200d that can perform this stimulation and measurement of the downstream channel. In FIG. 5, digital signal processing unit 200d includes equalizer 304 in dashed lines to represent that it is an optional component. As shown, digital signal processing unit 200d can include a channel sounding stimulus generator 501 which is configured to generate a stimulus signal to exercise the hardware channel downstream from digital signal processing unit 200d over a band of power and frequency that are pertinent to a target modulation bandwidth and operating condition of the power amplifier. In other words, channel sounding stimulus generator 501 can output a signal that approximates actual signals that will be supplied to the transmitter in a target application. Accordingly, digital signal processing unit 200d includes an output for supplying the output of channel sounding stimulus generator 501 to digital-to-analog converter 200f.

While channel sounding stimulus generator 501 is generating a stimulus signal, the output of power amplifier 100c, which would be based on this stimulus signal, will be fed back to digital signal processing unit 200d via input 405 and then filtered, level controlled, and converted into digital samples which will then be input to a channel estimator 502. Channel estimator 502 can evaluate the digital samples representing the output of power amplifier 100c in order to estimate the linear and non-linear distortion characteristics of the downstream transmitter channel. Based on these estimated characteristics, channel estimator 502 can then generate appropriate control inputs (e.g., parameters or coefficients) for each of intermodulation distortion suppressor 301, equalizer 302, linearizer 303, and possibly equalizer 304 so that these components can each generate pre-distortion to offset the estimated distortion. Accordingly, channel estimator 502 can include outputs 502a, 502b, 502c, and possibly 502d by which the corresponding control inputs can be provided to these components.

In some embodiments, channel sounding stimulus generator 501 and channel estimator 502 can be configured to operate periodically or on demand such that the pre-distortion generated by intermodulation distortion suppressor 301, equalizer 302, linearizer 303, and possibly equalizer 304 can likewise be updated periodically or on demand. This would allow optimization device 200 to dynamically account for distortion based on current operating conditions of the system. It would also allow optimization device 200 to easily update itself in response to a system change.

Figure 5A:
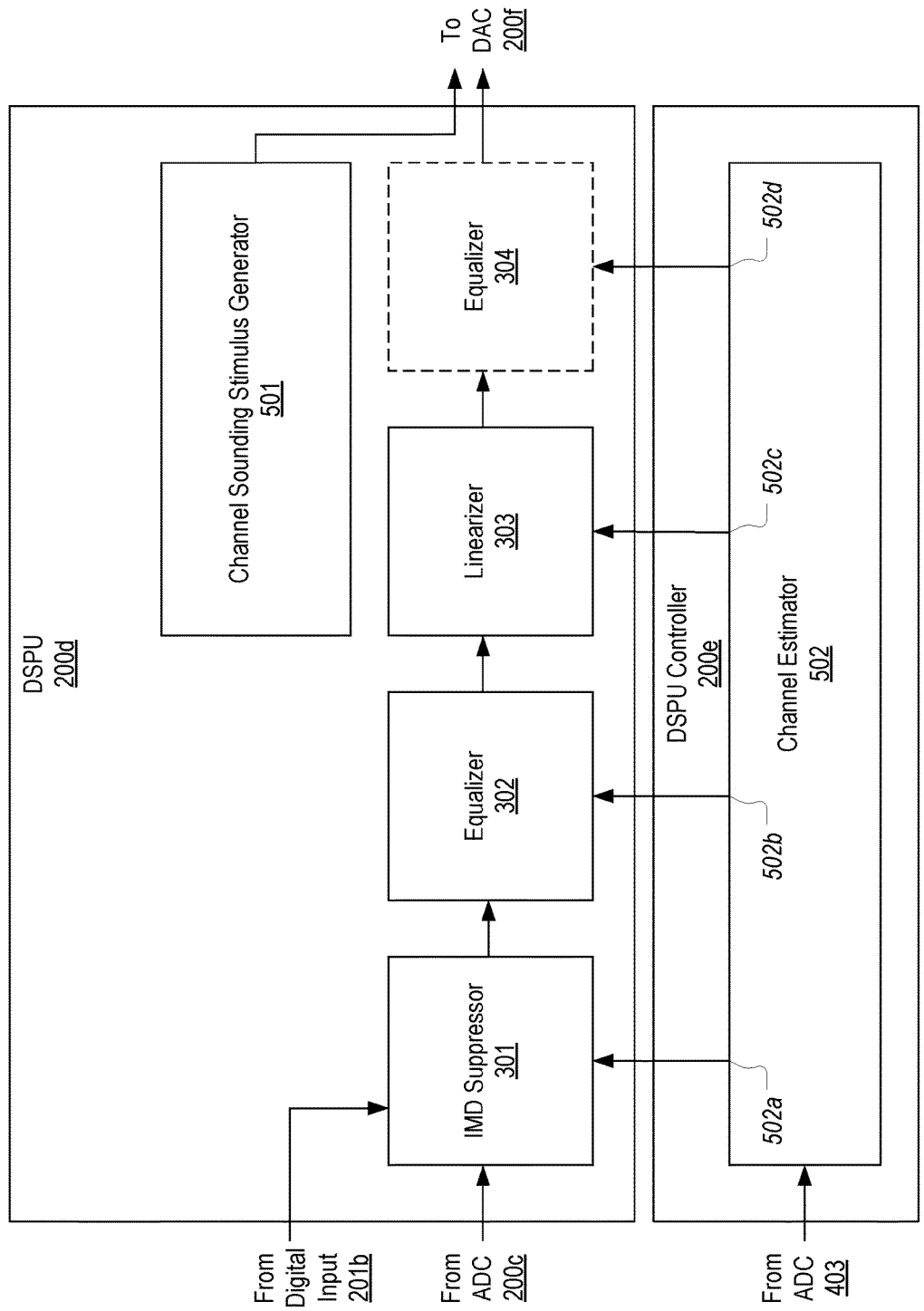
FIG. 5A illustrates an alternate embodiment in which a channel estimator is implemented within a digital signal processing unit controller as opposed to being directly implemented within the digital signal processing unit.

FIG. 5A illustrates an alternate embodiment in which channel estimator 502 resides in digital signal processing unit controller 200e rather than in digital signal processing unit 200d. In such embodiments, channel estimator 502 can perform the same functionality as described above. In these embodiments, digital signal processing unit controller 200e can serve the role of providing an interface for manual configuration of the components of digital signal processing unit 200d as mentioned above as well as the role of performing automatic configuration of these components based on identified distortion characteristics in a stimulus signal.

To summarize, optimization device 200 can be employed to optimize a transmitter channel for transmission of arbitrary signals such that the resultant signal-to-distortion noise ratio over the modulation bandwidth of the signal is maximized at the power amplifier. The optimization device 200 can accomplish this by performing intermodulation suppression, equalization, and linearization in the digital domain and can therefore be particularly beneficial in wideband systems (e.g., 500 MHz to 1 GHz bandwidth systems and wider). Because optimization device 200 is configured as a stand-alone component, it can easily be incorporated into a system for use with virtually any modulator and transmitter, and due to digital signal processing unit 200d, optimization device 200 can account for the distortion that may be generated in any of these many different systems.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A digital transmitter channel optimization device comprising:
   a first input configured to receive a signal from a modulator that is a component of a separate device;
   a digital signal processing unit configured to receive the signal and to apply pre-distortion to the signal in the digital domain, the digital signal processing unit comprising:
      an intermodulation distortion suppressor that is configured to reduce a peak-to-peak average power ratio of the signal to minimize clipping of the signal by a power amplifier of a transmitter;
      a first equalizer that is configured to introduce pre-distortion to the signal after the signal has been processed by the intermodulation distortion suppressor to thereby compensate for frequency-based distortion caused by one or more components of the transmitter that are positioned upstream of the power amplifier; and
      a linearizer that is configured to add additional pre-distortion to the signal after the signal has been processed by the first equalizer to thereby compensate for non-linear characteristics of the power amplifier;
   a channel sounding stimulus generator configured to generate a stimulus signal;
   a digital-to-analog converter for converting the pre-distorted signal or the analog stimulus signal to an analog signal;
   a first output configured to output the pre-distorted analog signal or the analog stimulus signal to the transmitter, the transmitter being a separate device,
   a second input for receiving the analog stimulus signal after the analog stimulus signal has been amplified by the power amplifier of the transmitter;
   a second analog-to-digital converter for producing digital samples of the amplified stimulus signal, and
   a channel estimator that receives the digital samples of the amplified stimulus signal and that is configured to estimate distortion present in the amplified stimulus signal and to configure one or more of the intermodulation distortion suppressor, the first equalizer, or the linearizer to generate pre-distortion based on the estimated distortion.

2. The optimization device of claim 1, wherein the first input is configured to receive a digital signal from the modulator.

3. The optimization device of claim 1, wherein the first input is configured to receive an analog signal from the modulator.

4. The optimization device of claim 3, further comprising:
   a first analog-to-digital converter positioned between the first input and the digital signal processing unit.

5. The optimization device of claim 4, further comprising:
   a first filter and a first level controller positioned between the first analog-to-digital converter and the first input.

6. The optimization device of claim 3, further comprising:
   a third input that is configured to receive a digital signal from the modulator.

7. The optimization device of claim 1, further comprising:
   a digital signal processing unit controller that is coupled to the digital signal processing unit and configured to control a configuration of one or more of the intermodulation distortion suppressor, the equalizer, or the linearizer based on manual input.

8. The optimization device of claim 1, further comprising:
   a second filter and a second level controller positioned between the digital-to-analog converter and the first output.

9. The optimization device of claim 1, wherein the digital signal processing unit further comprises a second equalizer.

10. The optimization device of claim 9, wherein the second equalizer is configured to pre-distort the signal to offset distortion caused by components of the transmitter downstream of the power amplifier.

11. The optimization device of claim 1, wherein the channel estimator is implemented in either the digital signal processing unit or a digital signal processing unit controller.

12. The optimization device of claim 1, further comprising:
   a frequency downconverter, a second filter, and a second level controller positioned between the second input and the second analog-to-digital converter.

13. A digital transmitter channel optimization device comprising:
   a first input configured to receive a signal from a modulator that is a component of a separate device;

a digital signal processing unit that includes a channel sounding stimulus generator that generates a stimulus signal, the digital signal processing unit also being configured to receive the signal from the modulator and to apply pre-distortion to the signal in the digital domain, the digital signal processing unit comprising:

an intermodulation distortion suppressor that is configured to reduce a peak-to-peak average power ratio of the signal to minimize clipping of the signal by a power amplifier of a transmitter;

an equalizer that is configured to introduce pre-distortion to the signal after the signal has been processed by the intermodulation distortion suppressor to thereby compensate for frequency-based distortion caused by one or more components of the transmitter that are positioned upstream of the power amplifier; and a linearizer that is configured to add additional pre-distortion to the signal after the signal has been processed by the first equalizer to thereby compensate for non-linear characteristics of the power amplifier; and a digital signal processing unit controller coupled to the digital signal processing unit, the digital signal processing unit controller configuring the intermodulation distortion suppressor, the first equalizer, and the linearizer;

a second input for receiving the stimulus signal after it has been amplified by the power amplifier of the transmitter with which the optimization device is used;

an analog-to-digital converter for converting the amplified stimulus signal into digital samples;

a channel estimator that is implemented in either the digital signal processing unit or the digital signal processing unit controller, the channel estimator receiving the digital samples of the amplified stimulus signal and estimating distortion in the amplified stimulus signal, the channel estimator configuring one or more of the intermodulation distortion suppressor, the equalizer, or the linearizer to introduce pre-distortion to the signal from the modulator based on the estimated distortion in the amplified stimulus signal;

a digital-to-analog converter for converting the pre-distorted signal from the modulator or the stimulus signal to an analog signal; and a first output configured to output the pre-distorted analog signal or the analog stimulus signal to the transmitter.

14. The optimization device of claim 13, wherein the first input is configured to receive the signal from the modulator as an analog signal, the optimization device further comprising a third input that is configured to receive a digital signal from the modulator and to provide the digital signal to the digital signal processing unit.

15. A digital transmitter channel optimization device comprising:

a first input configured to receive a signal from a modulator that is a component of a separate device;

a digital signal processing unit configured to receive the signal from the modulator and to apply pre-distortion to the signal in the digital domain, the digital signal processing unit further configured to generate a stimulus signal;

a digital-to-analog converter for converting the pre-distorted signal or the stimulus signal to an analog signal;

a first output configured to output the pre-distorted analog signal or the analog stimulus signal to a transmitter;

a second input for receiving the analog stimulus signal after the analog stimulus signal has been amplified by a power amplifier of the transmitter, the transmitter being a separate device;

an analog-to-digital converter for converting the amplified stimulus signal to digital samples; and a channel estimator that is configured to evaluate the digital samples of the amplified stimulus signal to estimate distortion present in the amplified stimulus signal, the channel estimator configuring the digital signal processing unit to apply the pre-distortion to the signal from the modulator based on the estimated distortion;

wherein the digital signal processing unit implements an intermodulation distortion suppressor, an equalizer, and a linearizer for applying pre-distortion to the signal from the modulator, the intermodulation distortion suppressor being configured to reduce a peak-to-peak average power ratio of the signal to minimize clipping of the signal by the power amplifier, the equalizer being configured to introduce pre-distortion to the signal after the signal has been processed by the intermodulation distortion suppressor to thereby compensate for frequency-based distortion caused by one or more components of the transmitter that are positioned upstream of the power amplifier, and the linearizer being configured to add additional pre-distortion to the signal after the signal has been processed by the equalizer to thereby compensate for non-linear characteristics of the power amplifier; and wherein configuring the digital signal processing unit based on the estimated distortion comprises setting one or more parameters of one or more of the intermodulation distortion suppressor, the equalizer, or the linearizer.

* * * * *